(12) United States Patent
Li et al.

(10) Patent No.: US 8,137,622 B2
(45) Date of Patent: Mar. 20, 2012

(54) DEVICE FOR WASHING AND HYBRIDIZATION OF BIOCHIPS

(75) Inventors: Hang Li, Beijing (CN); Jianxin Ye, Beijing (CN); Xingling Al, Beijing (CN); Xianhua Wang, Beijing (CN); Liang Zhang, Beijing (CN); Jing Cheng, Beijing (CN)

(73) Assignees: CapitalBio Corporation, Beijing (CN); Tsinghua University, Beijing (CN)

( * ) Notice: Subject to any disclaimer, the term of this patent is extended or adjusted under 35 U.S.C. 154(b) by 161 days.

(21) Appl. No.: 12/527,184

(22) PCT Filed: Oct. 9, 2007

(86) PCT No.: PCT/CN2007/002894
§ 371 (c)(1),
(2), (4) Date: Apr. 1, 2010

(87) PCT Pub. No.: WO2008/128399
PCT Pub. Date: Oct. 30, 2008

(65) Prior Publication Data
US 2010/0190663 A1    Jul. 29, 2010

(30) Foreign Application Priority Data
Apr. 20, 2007 (CN) .......................... 2007 1 0098574

(51) Int. Cl.
*B01F 11/00* (2006.01)
*B01F 11/04* (2006.01)
(52) U.S. Cl. .......... 422/64; 422/561; 366/208; 366/209; 366/215; 366/216; 366/217; 366/218; 366/111; 435/809

(58) Field of Classification Search ........................ None
See application file for complete search history.

(56) References Cited

U.S. PATENT DOCUMENTS

| | | | | | |
|---|---|---|---|---|---|
| 5,639,160 | A | * | 6/1997 | Kishimoto | 366/208 |
| 6,386,749 | B1 | * | 5/2002 | Watts et al. | 366/144 |
| 7,059,762 | B2 | * | 6/2006 | Yi et al. | 366/208 |
| 7,524,104 | B2 | * | 4/2009 | Malasky et al. | 366/208 |
| 7,578,612 | B2 | * | 8/2009 | Zhang et al. | 366/211 |
| 7,645,065 | B2 | * | 1/2010 | Bae | 366/111 |

FOREIGN PATENT DOCUMENTS

| | | | |
|---|---|---|---|
| CN | 1321890 | * | 11/2001 |
| CN | 1810387 | * | 2/2006 |
| CN | 101063078 | * | 10/2007 |
| WO | WO 2004/037400 A2 | * | 5/2004 |

* cited by examiner

Primary Examiner — P. Kathryn Wright
(74) Attorney, Agent, or Firm — Morrison & Foerster LLP

(57) ABSTRACT

A device for biochip hybridization or washing is provided, which comprises a carousel (12), a translational movement controller, a revolving movement controller, and optionally a heating chamber (13). The revolving movement controller controls the revolving movement of the carousel and allows it to move in a wobbling fashion, allowing liquid movement of the hybridization or washing boxes (11) during hybridization and/or washing of biochips on the carousel. The translational movement controller brings the carousel back to horizontal position once the revolving movement controller stops, thereby ensures that the liquid do not spill out. The heating chamber circulates hot air within the device, thereby ensures that the hybridization and washing in a thermostatic condition.

6 Claims, 2 Drawing Sheets

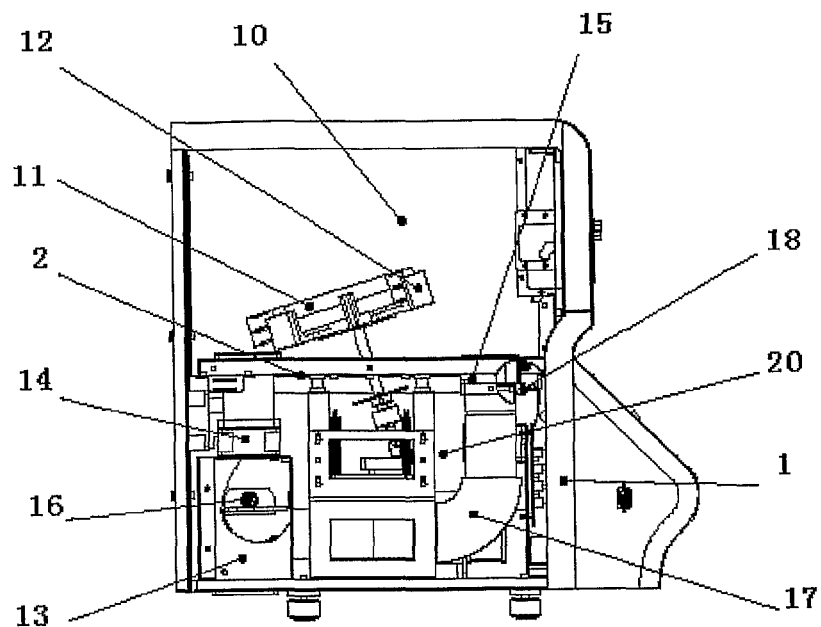
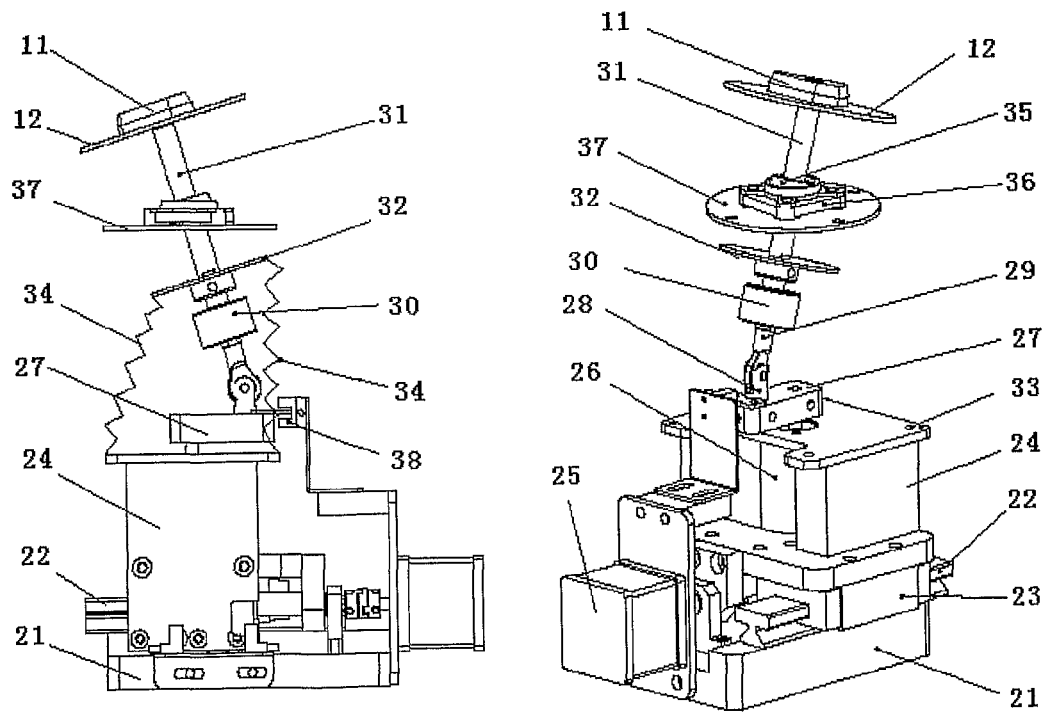
Figure 1
Figure 2      Figure 3

DEVICE FOR WASHING AND HYBRIDIZATION OF BIOCHIPS

CROSS-REFERENCE TO RELATED APPLICATIONS

This application is a National Phase filing under 35 U.S.C. §371 of International Application No. PCT/CN2007/002894 having an international filing date of Oct. 9, 2007, which claims priority to Chinese Patent Application No. 200710098574.7, filed on Apr. 20, 2007, the entire content of each of which is incorporated herein by reference.

TECHNICAL FIELD

The present invention relates to a device for biochip hybridization and washing.

BACKGROUND

Hybridization and washing devices currently used typically utilize thermostatic, humidistatic, and horizontal stationary methods. The disadvantages of such methods include poor hybridization efficiency and undesirable CV (coefficient of variation) for quantification analysis. The little space between the biochip slide and the cover slip hampers the free flow of the hybridization buffer and impairs the uniformity of hybridization efficiency across the chip. Chinese patent "A GENE CHIP HYBRIDIZATION APPARATUS" (ZL 200420049238.0) discloses a device for biochips having a frame and a carrier platform inside the frame. The carrier platform developed such a motion pattern that the axis perpendicular to the carrier wobbles around an axis perpendicular to the ground with a constant angle, thus any point on the carrier moves perpendicularly in a sinusoidal way and the amplitude increases along the radial direction on the carrier platform. The carrier platform holds a container accommodating biochips. The carrier platform of the device is capable of engaging in particular periodic motions to facilitate flowing of the buffer inside the hybridization chamber. The following problems, however, still exist: 1. Without a temperature control system, the device usually need an external thermostatic environment, such as water bath, for hybridization; 2. The chips remain tilted at all time once they are loaded onto the carrier. The device has to be turned on immediately after the chips are loaded, otherwise the buffer will leak out if the chips are left in a tilted position; 3. Additional devices or instruments are needed after hybridization for washing the chips.

SUMMARY OF THE INVENTION

The present invention provides a simple and efficient device for biochip hybridization and/or washing in an air bath, optionally under thermostatic conditions.

In some embodiments, there is provided a device for biochip hybridization or washing, comprising a carousel, a translational movement controller and a revolving movement controller, wherein the translational movement controller and the revolving movement controller control the movement of the carousel, and wherein the revolving movement controller is placed on the translational movement controller. In some embodiments, the revolving movement controller comprises a photoelectric sensor, wherein the photoelectric sensor senses the stop of the revolving movement controller and triggers the start of the translational movement controller, thereby brings the carousel to a horizontal position. In some embodiments, the device further comprises a heating chamber.

In some embodiments, there is provided a device for biochip hybridization or washing, comprising a carousel, a translational movement controller, a revolving movement controller, wherein the revolving movement controller drives the wobbling movement of the carousel, wherein the translational movement controller brings the carousel back to a horizontal position upon stop of the revolving movement controller, and wherein the revolving movement controller is placed on the translational movement controller. In some embodiments, the revolving movement controller comprises a photoelectric sensor, wherein the photoelectric sensor senses the stop of the revolving movement controller and triggers the start of the translational movement controller, thereby brings the carousel to a horizontal position. In some embodiments, the device further comprises a heating chamber.

In some embodiments, there is provided a device for biochip hybridization or washing, comprising a hybridization compartment and a heating chamber, wherein the hybridization compartment comprises a carousel and wherein the heating chamber and the hybridization compartment form a closed hot air circulation pathway. In some embodiments, the heating chamber comprises a temperature sensor. In some embodiments, the heating chamber comprises a temperature feedback control circuit. In some embodiments, the device further comprises a translational movement controller and a revolving movement controller, wherein the translational movement controller and the revolving movement controller control the movement of the carousel, and wherein the revolving movement controller is placed on the translational movement controller. In some embodiments, the translational movement controller and part of the revolving movement controller reside in a motion control compartment that is separated from the hybridization compartment (for example by a clapboard), and part of the revolving movement controller extends (for example through the clapboard) into the hybridization compartment and connect to the carousel.

In some embodiments, the translational movement controller comprises a base, a sliding rail on the base, a slide block on the sliding rail, a translational movement motor, and a driving assembly that couples the motor to the slide block. In some embodiments, the driving assembly comprises lead screw and screw nuts connected to the slide block.

In some embodiments, the revolving movement controller comprises a base, a revolving movement motor, an eccentric block coupled to the revolving movement motor, a pendulum shaft comprising an upper shaft and a lower shaft connected to each other via a bearing, wherein the lower shaft is connected to the eccentric block, and wherein the upper shaft is connected to the carousel. In some embodiments, the revolving movement controller further comprises a rotary disk fixed on the upper shaft and at least one (such as at least any of 2, 3, 4, 5, or 6) spring that connects the rotary disk to the base and pulls the rotary disk from rotating. In some embodiments, the revolving movement controller further comprises a flange comprising a universal joint, wherein the upper shaft protrudes through the universal joint on the flange and connects to the carousel. In some embodiments, the revolving movement controller further comprises a photoelectric sensor which senses the stop of the revolving movement controller and triggers the start of the translational movement controller, thereby brings the carousel to a horizontal position. In some embodiments, the photoelectric sensor is positioned in the plane that is perpendicular to the output axis of the translational movement motor and detects the eccentric end of the eccentric block. In some embodiments, the revolving movement controller is placed on the slide block of the translational movement controller. In some embodiments, the revolving movement controller comprise 4 springs.

In some embodiments, the heating chamber comprises a heater, a fan and a conduit, wherein the fan, the conduit, and the space where the carousel resides (for example the hybridization compartment) form a closed hot air circulating pathway. In some embodiments, the heating chamber comprises at least one heat exchanging fan (for example located in proximity to the heater) for delivering air into the heating chamber. In some embodiments, the heating chamber comprises at least one air circulating fan (for example located in proximity to the exit of the conduit) for delivering air into the space where the carousel is located (such as hybridization compartment). In some embodiments, there are at least two heat exchanging fans and at least two air circulating fans. In some embodiments, there are at least two conduits. In some embodiments, the heating chamber further comprises a temperature sensor for detecting the temperature of the hot air within the space where the carousel is located (for example the hybridization compartment). The temperature sensor may be located in proximity to the exit of the conduit.

In some embodiments, the carousel is mounted on top of the upper shaft of the revolving movement controller. In some embodiments, the top of the upper shaft comprises a boss (such as a triangular boss) that corresponds to a recess (such as a triangular recess) of a carousel. In some embodiments, at least one hybridization box is loaded onto the carousel. In some embodiments, at least one washing box is loaded onto the carousel. In some embodiments, the hybridization box and/or the washing box comprise at least one chip rack inside the box for holding the biochips. These chip racks may be inserted into locating pins in the boxes.

In some embodiments, there is provided a device for biochip hybridization or washing, comprising a carousel, a revolving movement control means for driving the wobbling movement of the carousel and a translational movement means for bringing the carousel back to a horizontal position upon stop of the revolving movement controller. In some embodiments, the device further comprises a means for sensing the stop of the revolving movement means and triggering the translational movement means. In some embodiments, the device further comprises a means for keeping the carousel under a thermostatic condition.

In some embodiments, there is provided a device for biochip hybridization or washing, comprising: a) a carousel, b) a translational movement controller comprising a base, a sliding rail on the base, a slide block on the sliding rail, a translational movement motor, and a driving assembly that couples the motor to the slide block; and c) a revolving movement controller comprising a base, a revolving movement motor, an eccentric block coupled to the revolving movement motor, a pendulum shaft comprising an upper shaft and a lower shaft connected to each other via a bearing, wherein the lower shaft is connected to the eccentric block and the upper shaft is connected to the carousel, and wherein the revolving movement controller is placed on the slide block of the translational movement controller.

In some embodiments, there is provided a device for biochip hybridization or washing, comprising: a) a carousel, b) a translational movement controller comprising a base, a sliding rail on the base, a slide block on the sliding rail, a translational movement motor, and a driving assembly that couples the motor to the slide block; and c) a revolving movement controller comprising a base, a revolving movement motor, an eccentric block coupled to the revolving movement motor, a pendulum shaft comprising an upper shaft and a lower shaft connected to each other via a bearing, a rotary disk fixed on the upper shaft and at least one (such as at least any of 2, 3, 4, 5, or 6) spring that connects the rotary disk to the base and pulls the rotary disk from rotating, wherein the lower shaft is connected to the eccentric block and the upper shaft is connected to the carousel, and wherein the revolving movement controller is placed on the slide block of the translational movement controller. In some embodiments, the revolving movement controller further comprises a flange comprising a universal joint, wherein the upper shaft protrudes through the universal joint on the flange and connects to the carousel.

In some embodiments, there is provided a device for biochip hybridization or washing, comprising: a) a carousel, b) a translational movement controller comprising a base, a sliding rail on the base, a slide block on the sliding rail, a translational movement motor, and a driving assembly that couples the motor to the slide block; and c) a revolving movement controller comprising a base, a revolving movement motor, an eccentric block coupled to the revolving movement motor, a pendulum shaft comprising an upper shaft and a lower shaft connected to each other via a bearing, a rotary disk fixed on the upper shaft and at least one (such as at least any of 2, 3, 4, 5, or 6) spring that connects the rotary disk to the base and pulls the rotary disk from rotating, and a photoelectric sensor, wherein the lower shaft is connected to the eccentric block and the upper shaft is connected to the carousel, and wherein the revolving movement controller is placed on the slide block of the translational movement controller, and wherein the photoelectric sensor senses the stop of the revolving movement controller and triggers the start of the translational movement controller, thereby brings the carousel to a horizontal position.

In some embodiments, there is provided a device for biochip hybridization or washing, comprising: a) a hybridization compartment comprising a carousel and b) a heating chamber comprising a heater, a fan and a conduit, wherein the fan, the conduit, and the hybridization compartment form a closed hot air circulating pathway. In some embodiments, the heating chamber further comprises a temperature sensor. In some embodiments, the heating chamber further comprises a temperature feedback control circuit.

In some embodiments, there is provided a device for biochip hybridization or washing, comprising: a) a hybridization compartment comprising a carousel; b) a heating chamber comprising a heater, a fan and a conduit, wherein the fan, the conduit, and the hybridization compartment form a closed hot air circulating pathway; c) a translational movement controller; and d) a revolving movement controller, wherein the translational movement controller and the revolving movement controller control the movement of the carousel, and wherein the revolving movement controller is placed on the translational movement controller. In some embodiments, the heating chamber further comprises a temperature sensor. In some embodiments, the heating chamber further comprises a temperature feedback control circuit.

In some embodiments, there is provided a device for biochip hybridization and washing, wherein the device comprises a case, wherein a clapboard separates the case into a hybridization compartment comprising a carousel and a motion control compartment; a heating chamber located beneath and connected to the hybridization compartment; wherein the heating chamber comprises a heater, a fan, and a conduit, wherein the fan and the conduit form a closed hot air circulating pathway between the hybridization compartment and the heating chamber, wherein the motion control compartment comprises a translational movement controller and a revolving movement controller on the top of the translational movement controller; and wherein the top of the revolving movement controller extends through the clapboard into the hybridization chamber and is coupled to the carousel.

The devices described herein can be used for biochip hybridization and/or washing. In some embodiments, the device is used for biochip hybridization. In some embodiments, the device is used for biochip washing. Various types of biochips can be efficiently hybridized and washed using the present device. In some embodiments, the biochip is a microarray, including, but is not limited to, a DNA microarray, an RNA microarray, a protein microarray, an antibody microarray, and a chemical compound microarray.

It is understood that aspects and embodiments of the invention described herein include "consisting" and/or "consisting essentially of" aspects and embodiments.

BRIEF DESCRIPTION OF THE DRAWINGS

FIG. 1 shows one exemplary embodiment of a device according to the invention.

FIG. 2 shows the side view of the translational and revolving movement controllers of the device depicted in FIG. 1.

FIG. 3 shows the perspective view of the translational and revolving movement controllers of the device depicted in FIG. 2.

DETAILED DESCRIPTION OF THE INVENTION

Figure 4:
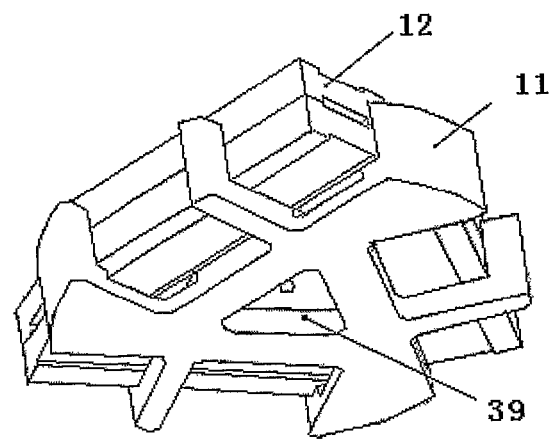
FIG. 4 shows an exemplary carrousel with recess at its bottom.

The present invention provides a device for biochip hybridization or washing, comprising a carousel, a translational movement controller, a revolving movement controller, and optionally a heating chamber. The revolving movement controller controls the revolving movement of the carousel and allows it to move in a wobbling fashion, allowing liquid movement during hybridization and/or washing of biochips on the carousel. The amplitude of the movement of each point on the carousel may show a sinusoidal wave function of the time. The translational movement controller brings the carousel back to a horizontal position once the revolving movement controller stops, thereby ensures that the liquid do not spill out. The heating chamber circulates hot air within the device, thereby ensures that the hybridization and washing in a thermostatic condition.

In some embodiments, the revolving movement controller is placed on the translational movement controller. In some embodiments, the revolving movement controller drives the wobbling movement of the carousel. In some embodiments, the translational movement controller brings the carousel back to a horizontal position upon stop of the revolving movement controller.

The revolving movement controller and the translational movement controller may be present in a single compartment as the carousel. In some embodiments, however, the carousel may reside in a hybridization compartment and the translational movement controller and part of the revolving movement controller may reside in a motion control compartment that is separated from the hybridization compartment (for example by a clapboard). Part of the revolving movement controller extends (for example through the clapboard) into the hybridization compartment and connect to the carousel.

In some embodiments, the device further comprises a heating chamber. The heating chamber and the space where the carousel resides (for example the hybridization compartment) may form a closed hot air circulation pathway to control the temperature in the space where the carousel resides (for example the hybridization compartment). In some embodiments, the heating chamber comprises a temperature sensor. In some embodiments, the heating chamber comprises a temperature feedback control circuit.

The translational movement controller may comprise a base, a sliding rail on the base, a slide block on the sliding rail, a translational movement motor, and a driving assembly that couples the motor to the slide block. In some embodiments, there are more than one (such as 2 or 3) sliding rails and corresponding sliding blocks. In some embodiments, the driving assembly comprises lead screw and screw nuts connected to the slide block.

The revolving movement controller may be placed on the translational movement controller. In some embodiments, the revolving movement controller is placed on the slide block of the translational movement controller.

The revolving movement controller described herein may comprise a base, a revolving movement motor, an eccentric block coupled to the revolving movement motor and a pendulum shaft. The pendulum shaft comprises an upper shaft and a lower shaft connected to each other via a bearing. The lower shaft is connected to the eccentric block, and the upper shaft is connected to the carousel. The revolving movement controller may further comprise a rotary disk fixed on the upper shaft and at least one (such as at least any of 2, 3, 4, 5, or 6) springs. These springs connect the rotary disk to the base and pull the rotary disk from rotating. In these embodiments, the revolving movement motor drives lower shaft to rotate. Due to the restriction of springs, the upper shaft does not rotate but only wobbles, thus allowing the carousel (and the hybridization box and/or washing box loaded on the carousel to move in a 3-D wobbling fluctuation.

The revolving movement controller may further comprise a flange comprising a universal joint, which allows the upper shaft to protrude through the universal joint and connect to the carousel. In some embodiments when a clapboard is used, the flange may be fixed on the clapboard.

In some embodiments, the revolving movement controller may further comprise a photoelectric sensor. The photoelectric sensor senses the stop of the revolving movement controller and triggers the start of the translational movement controller. In some embodiments, the photoelectric sensor is positioned in the plane that is perpendicular to the output axis of the translational movement motor and detects the eccentric end of the eccentric block. The translational movement motor drives the translational movement of the pendulum shaft, and can thus adjust the pendulum shaft to be perpendicular to the ground automatically after hybridization or wash procedure is completed. This avoids or reduces liquid leakage due to the tilted angle of the carrousel.

The translational movement controller and the revolving movement controller may use different motors, one for translational movement controller and the other for revolving movement controller. In some embodiments, the translational movement controller and the revolving movement controller may share the same motor or motors. In one embodiment of the invention, the translational movement controller and the revolving movement controller share a single motor.

As described above, in some embodiments, the revolving movement motor drives lower shaft to rotate. Due to the restriction of springs, the upper part of the pendulum shaft does not rotate but only wobbles. The translational movement motor implements the translational movement of the pendulum shaft. Thus, the instrument is capable of engaging the buffer in the hybridization chamber or the wash box in 3-D fluctuation, and it is able to adjust the pendulum shaft to be perpendicular to the ground automatically after hybridization or wash procedure is completed, thus avoids or reduces liquid leakage due to the tilted angle of the carrousel.

In one aspect of the invention, the device for biochip hybridization or washing further comprises a heating chamber for controlling the temperature in the space wherein the carousel is located (for example the hybridization compartment). In some embodiments, the heating chamber comprises a heater, at least one fan and at least one conduit. A skilled artisan can readily recognize that various heater can be used for controlling the temperature of the hybridization compartment. One of the examples of such heaters is a transistor. In addition to transistor, other types of electronic or non-electronic devices may also be used for controlling the temperature of the hybridization compartment. Other examples of heater include a ceramics heater, a semi-conductor type heater, etc. As used herein, heater should be construed broadly and may comprise any device or group of devices which are used to control the temperature of the hybridization compartment.

In some embodiments, the heating chamber comprises at least one (such as at least 2, 3, 4, 5, or 6) heat exchanging fans for delivering air into the heating chamber. The heat exchanging fans may be located in proximity to the heater. In some embodiments, the heating chamber comprises at least one (such as at least 2, 3, 4, 5, or 6) air circulating fans for delivering air into the space where the carousel is located (such as hybridization compartment). The air circulating fans may be located in proximity to the exit of the conduit.

In some embodiments, the heating chamber further comprises a temperature sensor for detecting the temperature of the hot air within the space wherein the carousel is located (for example the hybridization compartment). The temperature sensor may be located in proximity to the exit of the conduit. A skilled artisan can readily recognize that various temperature sensor can be used for detecting the temperature of the air within the hybridization compartment. One of the examples of such temperature sensor is a diode connected silicone transistor. Other types of temperature sensor can also be used for detecting the temperature of the hybridization compartment. For example, the temperature sensor could be a thermal resistor, a thermoelectric couple, or a thermal diode, etc.

The heating chamber keeps the carousel in a thermostatic environment using hot air. This ensures a constant temperature for hybridization. Furthermore, when the heating chamber comprises one or more heat exchanging fans, air circulation fans, and conduits, these components facilitate mixing of hot air and improve the temperature uniformity of biochip washing and hybridization.

The device further comprises a carrousel. One or more hybridization or washing boxes containing biochips can be loaded onto the carrousel. The upper shaft of the revolving movement controller and the carrousel can be coupled through a boss (such as a triangular boss) on top of the upper shaft and a corresponding recess (such as a triangular recess) at the bottom of the carrousel, or vice versa.

The carrousel described herein can be used to hold one or more boxes for hybridization and/or washing. The boxes may have one or more slots for holding biochips. For example, the wash box or hybridization boxes may comprise locating pins and chip racks fixed inserted into the locating pins for holding the biochips.

The biochips that can be washed or hybridized using the device of the present invention can be microarrays, including, but are not limited to, DNA microarrays, RNA microarrays, protein microarrays, antibody microarrays, and chemical compound microarrays. The boxes described herein may contain additional components, such as hybridization buffer and wash buffer. A skill artisan would readily recognize other usages of the box in the microarray technology.

The device can be used for both hybridizing and washing biochips and eliminates the necessity of extra washing apparatus. This reduces cost and provides a simple and convenient method of operation. With these features, the present invention could have broad applications in the entire scope of biochip hybridization and wash applications.

The invention is further illustrated with reference to the figures, which show one exemplary embodiment of the present invention.

FIG. 1 shows one exemplary device of the present invention. The device comprises case 1, which is divided into an upper part and a lower part by clapboard 2. The upper part is the hybridization compartment 10, the lower part is the motion control compartment 20.

Hybridization compartment contains carrousel 12, which holds one or more hybridization boxes 11. There are two to four openings for fans at the bottom of the hybridization compartment 10 (In the exemplary embodiment, there are four opening. The invention, however, is not limited to the exemplary embodiment). Heat exchanging fans 14 are located on the upper part of heating chamber 13 and deliver hot air to the heating chamber through two of the four openings on the clapboard. Air circulating fans 15 deliver air into the hybridization compartment through the other two openings. The heating chamber 13 contains heater 16. The inlets of the air circulating fans 15 are connected to the outlet of the heating chamber through conduits 17 to form a closed hot air pathway. Temperature sensor 18 is located in the proximity of the outlet of conduits 17 to monitor the temperature within the hybridization compartment 10.

As shown in FIGS. 2 and 3, motion control compartment 20 contains a translational movement controller and a revolving movement controller that control the three-dimensional movement of the carrousel containing the hybridization box or the wash box.

The translational movement controller has base 21 with sliding rail 22 and slide block 23 on sliding rail 22. On the other side of base 21 there are rollers (not shown in FIG. 3) supporting slide block 23 to move along the sliding rail. Motor base 24 lies on the top of slide block 23. Translational movement motor 25 (for example a step motor) is fixed at one end of the base 21. The output axis of translational movement motor 25 is coupled to a lead screw (not shown in figures), and base 24 is coupled to a screw nut on the lead screw, thus the translational movement motor 25 drives base 24 along the sliding rail 22 through the lead screw. Other state-of-the-art transmission mechanisms for translational movement could be utilized instead.

The revolving movement controller comprises revolving movement motor 26 (for example a DC motor) fixed on base 24, eccentric block 27 coupled to the output axis of revolving movement motor 26. The lower shaft 29 of the pendulum shaft is coupled to the other end of the eccentric block 27 through a spherical bearing 28. The lower shaft 29 is coupled to the upper shaft 31 of the pendulum shaft through bearing 30. Rotary disk 32 is fixed on the upper shaft 31 of the pendulum shaft. There are several holes 33 on base 24 and corresponding holes on rotary disk 32. Springs can be mounted to anchor each pair of corresponding holes and hold the rotary disk from revolving around the axis. In the exemplary embodiment, there are four springs and holes hold the rotary disk from revolving. In some other embodiments of the invention, there could be three to six springs and holes, or any other reasonable numbers of springs and holes. The upper shaft 31 and lower shaft 29 are coupled to the inner and outer race of the bearing 30 respectively, thus they are able to rotate around the common central axis independently. When the upper shaft 31 is driven by the revolving movement motor 26 through eccentric block 27 and about to spin around its central axis, the rotary disk 32 is pulled back by the springs 34, preventing the upper shaft 31 from revolving around its central axis. Above the rotary disk 32, there is a flange 37 containing spherical joint 35 fixed on the upper shaft 31. The flange has a spherical sink 36, wherein the flange is coupled to the spherical joint 35 through the spherical sink 36. The flange 37 is fixed on the clapboard 2 in the case 1. During the precession (wobbling movement) of the upper shaft 31 of the pendulum shaft, the spherical joint 35 would allow rotation in all directions in the spherical sink 36 and movement along the central axis of the upper shaft 31 of the pendulum shaft. There is a photoelectrical sensor 38 located in a plane perpendicular to the axis of the translational movement motor 25, to detect the eccentric end of the eccentric block 27. The sensor 38 ensures that when the revolving movement motor 26 stops, the eccentric block, which drives the movement of the upper shaft 31 and lower shaft 29, is positioned within the axis of the translational movement motor 25. The translational movement motor 25 drives the translational movement of the upper shaft 31 and lower shaft 20 so that they are perpendicular to the ground (and the flange), thus bring the hybridization chamber on the carrousel to a horizontal position, and avoid the leakage of the hybridization buffer.

Figure 5:
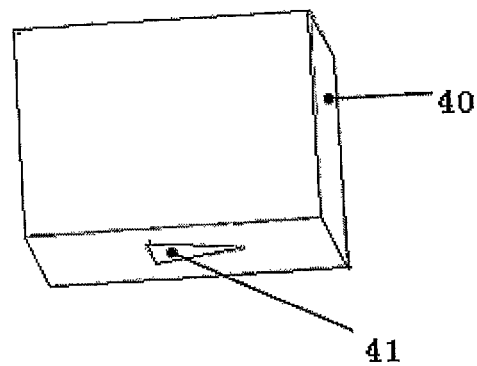
FIG. 5 shows an exemplary washing box with recess at its bottom.
Figure 6:
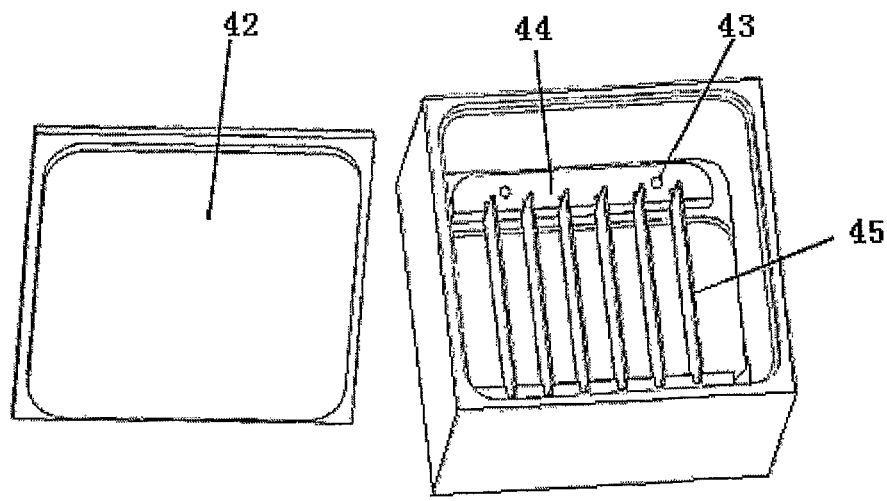
FIG. 6 shows the interior of an exemplary washing box.

In the exemplary embodiment, the upper shaft 31 is coupled to the carrousel 12 holding the hybridization boxes 11 via a boss with a triangular cross section at the top of the upper shaft 31 and a corresponding triangular recess 39 at the bottom of the carrousel 12 (FIG. 4). The device can also comprise at least one wash box 40 (FIG. 5). There is also a triangular recess 41 at the bottom of the wash box 40, which allows it to couple to the upper shaft 31. As shown in FIG. 6, the wash box 40 has a lid 42 in order to prevent the washing buffer inside the box from spilling out during the washing process. There are locating pins 43 on the sides of the wash box 40, and chip racks 44 inserted onto locating pins 43. The biochips 45 are placed on chip racks 44.

In the above example, the heat exchanging fans 14 and air circulating fans 15 are heat-resistant fans, and their speed are adjustable by adjusting the voltage. The numbers of heat exchanging fans 14, air circulating fans 15, and air circulating conduits could vary. In some embodiments, there are at least one heat exchanging fans, at least one air circulating fans, and at least one air circulating conduits. In some other embodiments, there are two heat exchanging fan, two air circulating fans, and two air circulating conduits, with improved thermo uniformity inside the hybridization compartment 10. The heater 16 could be a resistor, a ceramics heater, or a semiconductor type heater, etc. The temperature sensor 18 could be a thermal resistor, a thermoelectric couple, or a thermal diode, etc. Outside of the hybridization compartment, heating chamber 13 and air circulating conduits 17, there are heat isolating materials. The hybridization box 11 and carrousel 12 could be implemented with any state-of-the-art technology, or any other solutions which a skilled artisan in the field could come up with. The wash box 40 could be made of organic glass with transparent walls to facilitate disassembly and sealing, but could also be implemented with any state-of-the-art technology, or any other solutions which a skilled artisan in the field could come up with.

The electronic control circuits of this example comprise two parts. One part is the feedback of temperature sensor 18, to adjust the output power of heater 16 and control the operation of fans 14 and 15 independently, thus to maintain the hybridization compartment thermostatic. The other part is the control on motor 26 to drive the wobble movement of hybridization box 11 via the lower shaft 29 and upper shaft 31 of the pendulum shaft, together with the control on the translational movement motor 25 to adjust the range of wobble movement and to return the carrousel to horizontal position. The control circuits of described herein can be implemented with any state-of-the-art technology, and can be connected to and supervised by a computer.

The temperature control within the hybridization compartment 10 can be implemented as the following: The circuit controller receives target temperature set by the users and samples the air temperature within the hybridization compartment 10 via the temperature sensor 18. The circuit controller reads out the measurement, calculates the temperature deviation from the target temperature, and turns on and adjusts the power output of heater 16 to heat the air in the heating chamber 13. At the same time, hot air circulates between conduits 17 and hybridization compartment 10 using heat exchanging fans 14 and air circulating fans 15, thus heat up and maintain the air temperature at the target temperature.

A cycle of biochip hybridization is elaborated as follows. The hybridization box 11 is first loaded onto the carrousel 12, which in turn is loaded onto the top of the upper shaft 31. Then the translational movement motor 25 is turned on, which moves slide block 23 along sliding rail 22, and turns the pendulum shaft to a certain angle relative to the ground according to the users' demand. The translational movement motor 25 is then stopped and the revolving movement motor 26 is started to move the upper shaft 31 and lower shaft 29 via eccentric block 27. The movement of bearing 30 is composed of its axial rotation and revolution about the axis of the revolving movement motor 26. Due to pulling action of springs 34, the rotary disk 32 holds back the upper shaft 31 from its axial rotation, thus allows the carrousel 12 to take a 3-D wobble movement under the drive of the upper shaft 31. Every point on the carousel would move up and down, the amplitude of the movement depending on the eccentric radius of the eccentric block with each point showing a sinusoidal wave function of the time. The wobble amplitude of every position on the carrousel depends on the angle formed by the pendulum shaft and the level plane. When hybridization completes, the eccentric block will stop at a particular position due to the photoelectric sensor 38, where the central axis of the eccentric block intersects with the axis of the translational movement motor. At this point, the translational movement motor 25 is started again to adjust the upper shaft 31 and lower shaft 29 so that they are perpendicular to the ground, thus return the carrousel 12 which holds the hybridization boxes 11 to horizontal position. This ensures that the hybridization buffer do not leak out of the hybridization boxes. Finally, the carrousel 12 is taken out and the hybridization boxes 11 are unloaded to complete one cycle of the hybridization.

The washing of the biochips can be carried out in the same manner as that of the hybridization, except that wash box 40 with chips and washing buffer instead of hybridization boxes are loaded onto the carrousel.

What is claimed is:

1. A device for biochip hybridization or washing, comprising:
   a) a carousel;
   b) a translational movement controller comprising a base, a sliding rail on the base, a slide block on the sliding rail, a translational movement motor, and a driving assembly that couples the motor to the slide block; and
   c) a revolving movement controller comprising a base, a revolving movement motor, an eccentric block coupled to the revolving movement motor, a pendulum shaft comprising an upper shaft and a lower shaft connected to each other via a bearing, a rotary disk fixed on the upper shaft and a plurality of springs that connect the rotary disk to the base and pulls the rotary disk from rotating, and a photoelectric sensor, wherein the lower shaft is connected to the eccentric block and the upper shaft is connected to the carousel,
   wherein the revolving movement controller is placed on the slide block of the translational movement controller, and
   wherein the photoelectric sensor senses the stop of the revolving movement controller and triggers the start of the translational movement controller, thereby brings the carousel to a horizontal position.

2. The device of claim 1, further comprising a heating chamber.

3. The device of claim 2, wherein the heating chamber comprises a temperature sensor.

4. The device of claim 2, wherein the heating chamber comprises a heater, a fan, and a conduit, wherein the fan, the conduit and the space where the carousel resides form a closed hot air circulating pathway.

5. The device of claim 4, wherein the heating chamber comprises at least two air circulating fans and at least two heat exchanging fans.

6. The device of claim 5, wherein the heating chamber comprises at least two air conduits.

* * * * *